United States Patent
Masuda

(10) Patent No.: US 7,063,286 B2
(45) Date of Patent: Jun. 20, 2006

(54) TAPE THREADING APPARATUS

(75) Inventor: Takashi Masuda, Tokyo (JP)

(73) Assignee: NEC Corporation, Tokyo (JP)

(*) Notice: Subject to any disclaimer, the term of this patent is extended or adjusted under 35 U.S.C. 154(b) by 23 days.

(21) Appl. No.: 10/715,530

(22) Filed: Nov. 19, 2003

(65) Prior Publication Data

US 2004/0099757 A1 May 27, 2004

(30) Foreign Application Priority Data

Nov. 21, 2002 (JP) .............................. 2002-338077

(51) Int. Cl.
G03B 1/58 (2006.01)

(52) U.S. Cl. ..................................... 242/332.4; 360/132

(58) Field of Classification Search ................ 242/332, 242/332.4, 332.7, 332.8, 532.1, 532.6, 532.7, 242/582; 360/132
See application file for complete search history.

(56) References Cited

U.S. PATENT DOCUMENTS

| | | | | |
|---|---|---|---|---|
| 5,979,813 A * | 11/1999 | Mansbridge et al. | ..... | 242/332.4 |
| 6,318,656 B1 * | 11/2001 | Nemeth | ..... | 242/332.4 |
| 6,322,014 B1 * | 11/2001 | Nemeth | ..... | 242/332.4 |
| 6,330,983 B1 * | 12/2001 | Augustin | ..... | 242/332.4 |
| 6,360,978 B1 * | 3/2002 | Augustin et al. | ..... | 242/332.4 |
| 6,364,232 B1 * | 4/2002 | Nemeth et al. | ..... | 242/332.4 |
| 6,471,150 B1 * | 10/2002 | Tsuchiya et al. | ..... | 242/332.4 |
| 2004/0004142 A1 * | 1/2004 | Gavit et al. | ..... | 242/332.4 |

FOREIGN PATENT DOCUMENTS

| | | |
|---|---|---|
| JP | 2000-331403 | 11/2000 |
| JP | 2001-135003 | 5/2001 |

* cited by examiner

Primary Examiner—William A. Rivera
(74) Attorney, Agent, or Firm—Young & Thompson

(57) ABSTRACT

A threading mechanism in a magnetic writing/reading apparatus wherein a leader block for taking a magnetic tape out of a tape cartridge is stabilized in motion and ensured to operate reliably even in a state of not holding the tape is to be provided. In the mechanism for threading the magnetic tape to a reel within the apparatus, the leader block for taking out a leader pin out of the tape cartridge is rotatably fitted to the arm shaft of a movable arm, and the leader block moves along guides at the time of loading the tape cartridge.

16 Claims, 9 Drawing Sheets

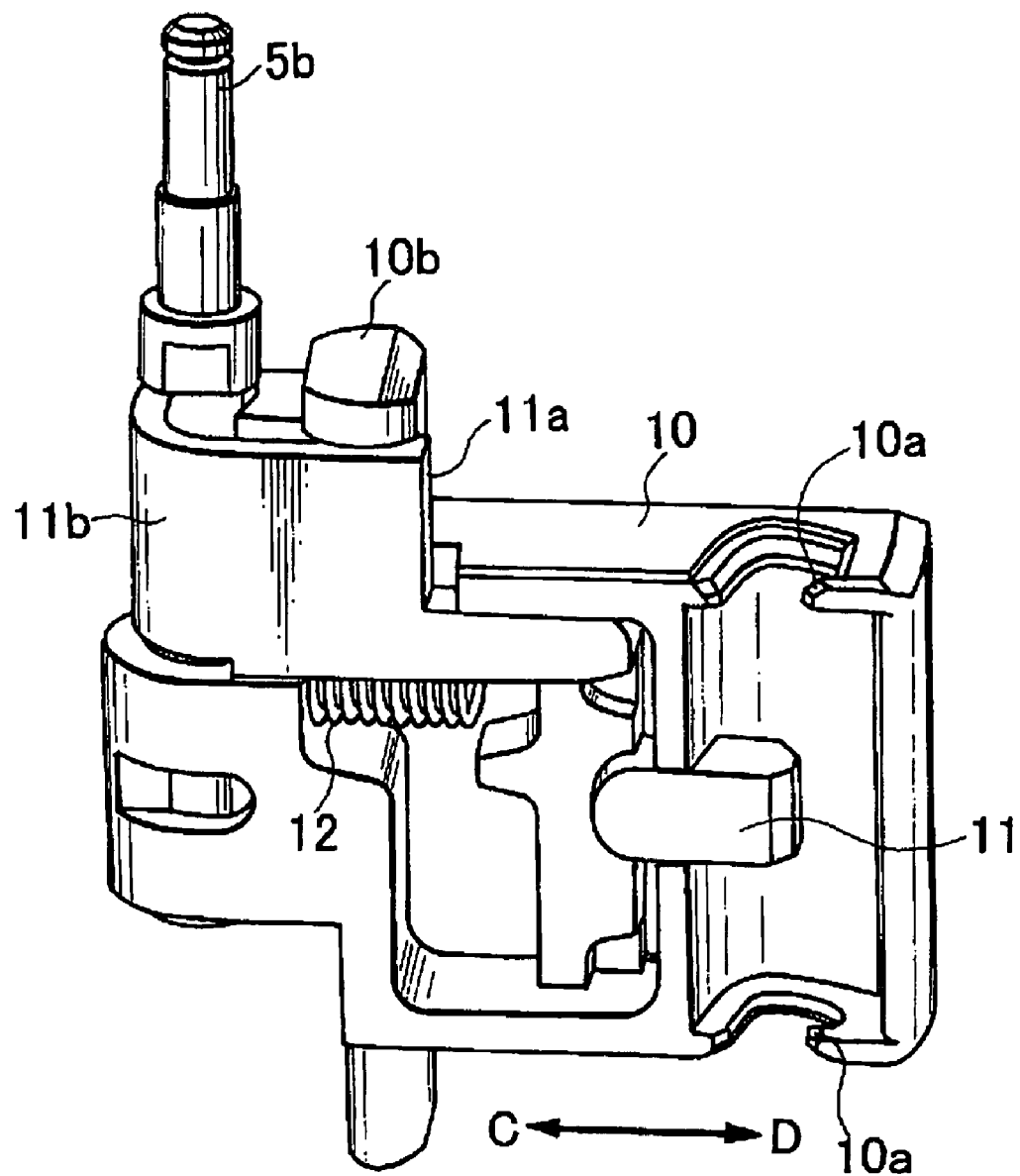
F I G. 2

TAPE THREADING APPARATUS

BACKGROUND OF THE INVENTION

The present invention relates to a threading mechanism in a magnetic writing/reading apparatus, and more particularly to a threading mechanism in a magnetic writing/reading apparatus by which a leader pin, fitted to one end of a magnetic recording tape, is taken out of a tape cartridge, and shifted to a prescribed guide path to thread the magnetic recording tape onto a reel in the apparatus.

Related Art

In a conventional threading mechanism, when a tape cartridge is loaded and the magnetic tape therein is pulled out of the tape cartridge, the leader pin fitted to one end of the magnetic tape is held to a leader block by a threader drive, and the leader pin is guided to a reel by way of a guide path.

In order to ensure smooth threading, the leader block should be freely rotatable relative to the arm shaft. When the tape is being pulled, the leader block is pulled by the tape toward the tape cartridge and the operation is thereby stabilized. However, if the tape comes off the leader block while it is being threaded, the leader block will turn and be made unable to be inserted into the tape cartridge, and the apparatus can no longer function as such.

Further, the leader block should turn within the take-up reel together with the reel. To enable them to turn, there should be a gap between the arm shaft and the leader block. For this purpose, merely providing a guide cannot stabilize the operation of the leader block, resulting in difficulty to insert it into the cartridge.

FIG. 6 comprise FIG. 6A, which shows a plan of a tape cartridge in the magnetic tape device of a magnetic writing/reading apparatus, and FIG. 6B, which shows a front view of the same.

In a tape cartridge 50 is accommodated a tape 50b on which magnetic records are to be written. At the tip of the tape 50b is provided a leader pin 50a for use in pulling the tape out of the tape cartridge 50.

FIGS. 7 through 9 illustrate an example of the conventional art disclosed in the Japanese Patent Application Laid-open No. 2001-135003. FIG. 7 shows a plan of the threading mechanism of a magnetic writing/reading apparatus. FIG. 8 illustrates apart of the threading mechanism in which an arm 131 and a leader block 133 are arranged.

A loader drive gear 111 turns in the direction of arrow E, and a threader drive gear 112 coupled to the loader drive gear 111 turns in the direction of arrow F. Then a roller 123 fitted to the arm 131 passes a cam groove 124 provided in the threader drive gear 112 and reaches a cam groove end 125. Along with that, a roller 126 shifts along a guide groove 127 provided in a plate 134. As a result, the arm 131 and the leader block 133 at its tip shift. During the shift, the leader block 133 is free to rotate.

The leader block 133 is freely rotatable relative to an arm shaft 131a. If the leader block 133 is moved with the arm shaft 131a in this state, the direction of the leader block 133 cannot be stabilized.

The leader pin 50a of the magnetic tape is engaged with and held by hooked parts 80a provided at both the top and the bottom of the leader block 133. However, engagement with such simple hooked parts cannot securely hold the leader pin 50a. For this reason, a structure in which the force to hold the leader pin 50a is enhanced is conceivable.

FIG. 9A and FIG. 9B illustrate the structure of the leader block of such a threading mechanism.

A leader block 80 is fitted with a spring 81. When the leader pin 50a enters the hooked parts 80a, it is pressed against the leader block 80 by the spring 81, resulting in an enhanced holding force.

However, a threading mechanism of this structure would involve the following problems.

First, if the tape comes off during operation, the device will lose its mechanical function, because the leader block would then be freed and its direction destabilized, making it impossible to return the leader block into the cartridge merely by moving the arm.

Second, the shape of the leader block is made complex as shown in FIG. 8, and the cost of parts will increase correspondingly, because a rotary part should be added to the arm shaft part to prevent the leader block from interfering with the cartridge when the base is loaded with the cartridge.

Third, the insecure holding of the leader pin against the leader block makes it more likely to come off the leader block, because the leader pin is supported only by the hooked parts of the leader block. Even if a structure in which springs are fitted to the leader block is used, after repeated engagement and disengagement of the leader pin, the hooked parts of the leader block may be broken, because every time the leader pin is engaged or disengaged, the leader pin and the leader block come into friction with each other and, moreover, the shape of the leader pin requires the hooked parts to be thin. As a result, repetition of the engagement and disengagement of the leader pin would make it impossible to record data on the magnetic tape, because the wear due to the engagement and disengagement would scrape the leader block to generate dust. Thus, dust coming between the tape and the head would create a gap, which would make recording impossible.

SUMMARY OF THE INVENTION

Therefore, it is an object of the present invention to provide a threading mechanism for use in a magnetic writing/reading apparatus to move a leader block for pulling the magnetic tape out of the tape cartridge from the tape take-up reel to the tape cartridge, wherein the motions of the leader block are stabilized and enabled to operate reliably even in a state they are not holding the tape and the leader pin is held stably to prevent the leader block from becoming worn.

The present invention provides an apparatus for threading a tape wound on a supply reel and provided with a coupling element at a free end thereof. In accordance with the present invention, the apparatus comprises a take-up reel, a leader block adapted to establish a connection with the coupling element of the tape and assuming one of a connected state and an unconnected state, a carriage transporting the leader block between a first position near the supply reel and a second position near the take-up reel through intermediate positions along a moving path, a shaft rotatably connecting the leader block and the carriage, and a holding element selectively restraining and releasing rotation of the leader block with respect to the carriage depending on a state and/or a position of the leader block.

The holding element may restrain rotation of the leader block when the leader block is positioned in at least a part of the intermediate positions, and the holding element may release rotation of the leader block when the leader block is positioned in the first position.

The holding element may restrain rotation of the leader block when the leader block is in the unconnected state and positioned in at least a part of the intermediate positions, the holding element may release rotation of the leader block when the leader block is positioned in the first position, and the holding element may release rotation of the leader block when the leader block is in the connected state and positioned in at least a part of the intermediate positions.

The holding element may comprise a clamp selectively assuming one of a holding position and a releasing position, the clamp may hold the shaft when the clamp is in the holding position, and the clamp may release the shaft when the clamp is in the releasing position.

The clamp may assume the holding position when the leader block is positioned in at least a part of the intermediate positions, and the clamp may assume the releasing position when the leader block is positioned in the first position.

The clamp may comprise a spring and a first tab, the spring may bias the clamp toward the holding position, and the clamp may move from the holding position to the releasing position when the first tab is moved.

The clamp may assume the holding position when the leader block is in the unconnected state and positioned in at least a part of the intermediate positions, the clamp may assume the releasing position when the leader block is positioned in the first position, and the clamp may assume the releasing position when the leader block is in the connected state and positioned in at least a part of the intermediate positions.

The clamp may comprise a spring, a first tab and a second tab, the spring may bias the clamp toward the holding position, the clamp may move from the holding position to the releasing position when the first tab is moved, and the second tab may hold the clamp in the releasing position by contacting the coupling element of the tape when the leader block is in the connected state.

The second tab may retain the coupling element of the tape.

The holding element may comprise a guide along the moving path receiving and guiding at least a portion of the leader block.

The coupling element may comprise a pin, and the leader block may have a groove adapted to receive the pin.

The apparatus may comprise a take-up reel, a leader block adapted to establish a connection with the coupling element of the tape and assuming one of a connected state and an unconnected state, means for transporting the leader block between a first position near the supply reel and a second position near the take-up reel through intermediate positions along a moving path, means for rotatably connecting the leader block and the means for transporting, and means for selectively restraining and releasing rotation of the leader block with respect to the means for transporting depending on a state and/or a position of the leader block.

The present invention also provides a data storage apparatus for threading a tape wound on a supply reel and provided with a coupling element at a free end thereof in order to execute a read and/or a write operation on the tape. In accordance with the present invention, the data storage apparatus comprises a take-up reel, a leader block adapted to establish a connection with the coupling element of the tape and assuming one of a connected state and an unconnected state, a carriage transporting the leader block between a first position near the supply reel and a second position near the take-up reel through intermediate positions along a moving path, a shaft rotatably connecting the leader block and the carriage, and a holding element selectively restraining and releasing rotation of the leader block with respect to the carriage depending on a state and/or a position of the leader block.

The supply reel, the take-up reel, the coupling element, the carriage and the guide could be embodied in the form of a reel 50c, a reel 3, a leader pin 50a, an arm 5 and guides 30 through 33 shown in FIGS. 1A to 1D, respectively. The leader block, the shaft, the clamp, the spring, the first tab, the second tab and the groove could be embodied in the form of a leader block 10, an arm shaft 5b, a shaft holder 11b, a leader block spring 12, a holder post 11a, a leader block holder 11 and hooked parts 10a shown in FIG. 2, respectively.

BRIEF DESCRIPTION OF THE DRAWINGS

The novel features believed to be characteristic of the invention are set forth in the appended claims. The invention itself, however, as well as other features and advantages thereof, will be best understood by reference to the following detailed description when read in conjunction with the accompanying drawings, wherein:

FIG. 2 illustrates the structure of a leader block and a leader block holder;

DESCRIPTION OF THE PREFFERED EMBODIMENT

A preferred embodiment of the present invention will be described below with reference to accompanying drawings.

[Structure]

Figure 1A:
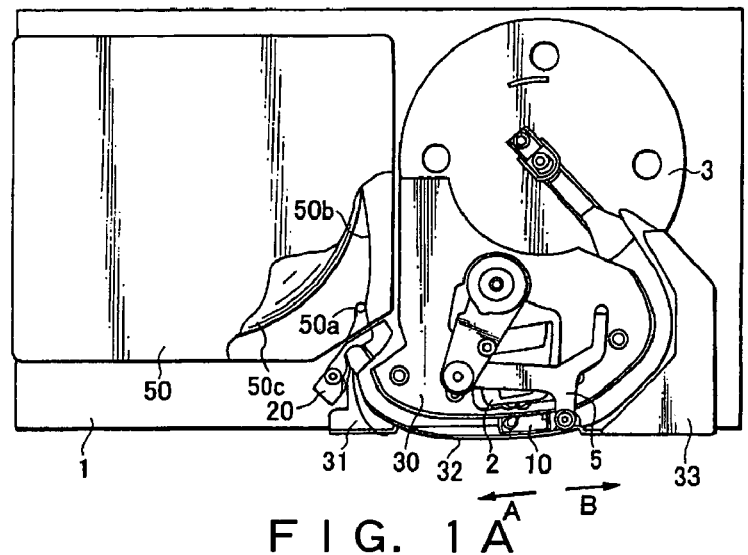
FIG. 1A shows a plan of a threading mechanism of a magnetic writing/reading apparatus according to the invention.
Figure 1B:
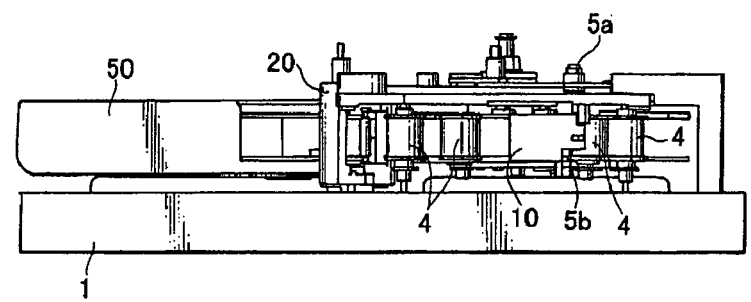
FIG. 1B shows a front view of the threading mechanism of the magnetic writing/reading apparatus.
Figures 1C, 1D:
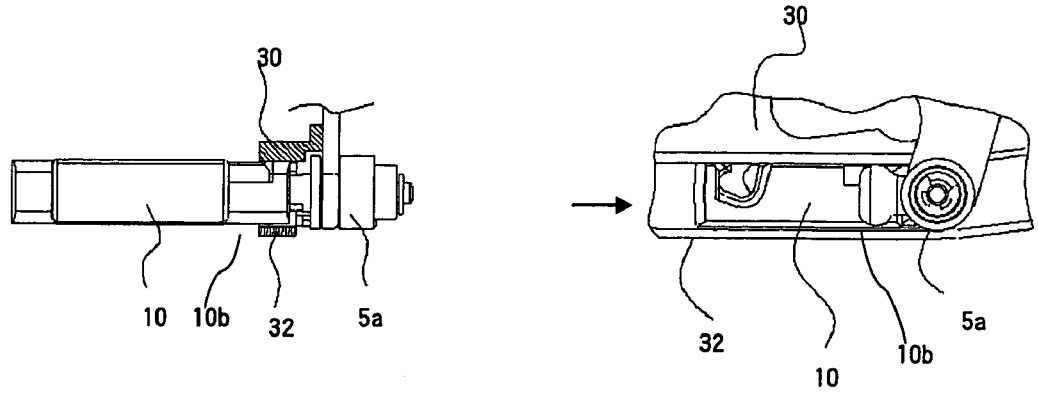
FIG. 1C shows an enlarged view of the leader block in the direction of an arrow in FIG. 1D.
FIG. 1D shows an enlarged view of the leader block in FIG. 1A.

FIG. 1 consists of FIG. 1A, which shows a plan of a magnetic writing/reading apparatus according to the invention, FIG. 1B, which shows a front view of the same, FIG. 1D, which shows an enlarged view of the leader block 10 in FIG. 1A, and FIG. 1C, which shows an enlarged view of the leader block 10 in the direction of an arrow in FIG. 1D.

Figure 6A:
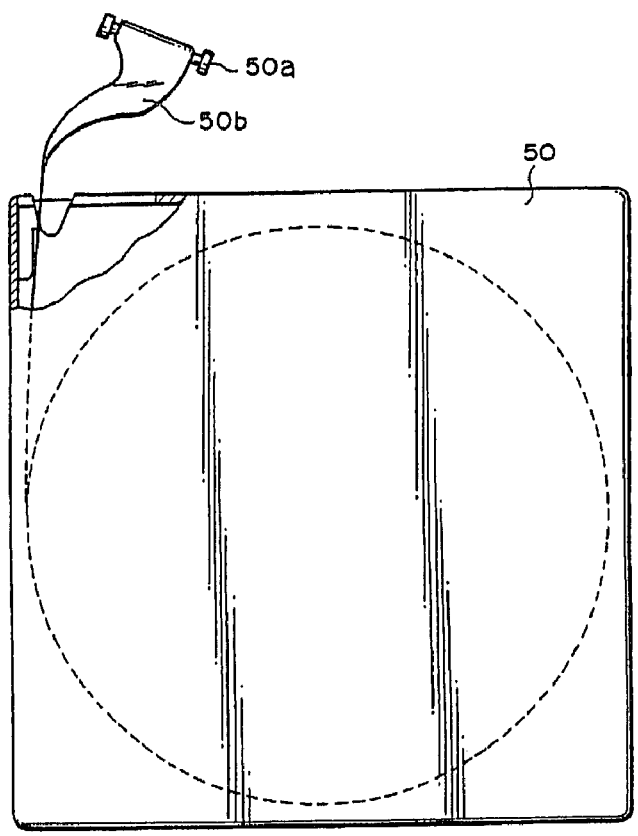
FIG. 6A shows a plan of a tape cartridge.
Figure 6B:
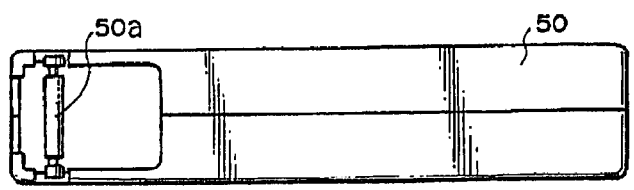
FIG. 6B shows a front view of the tape cartridge.
Figure 7:
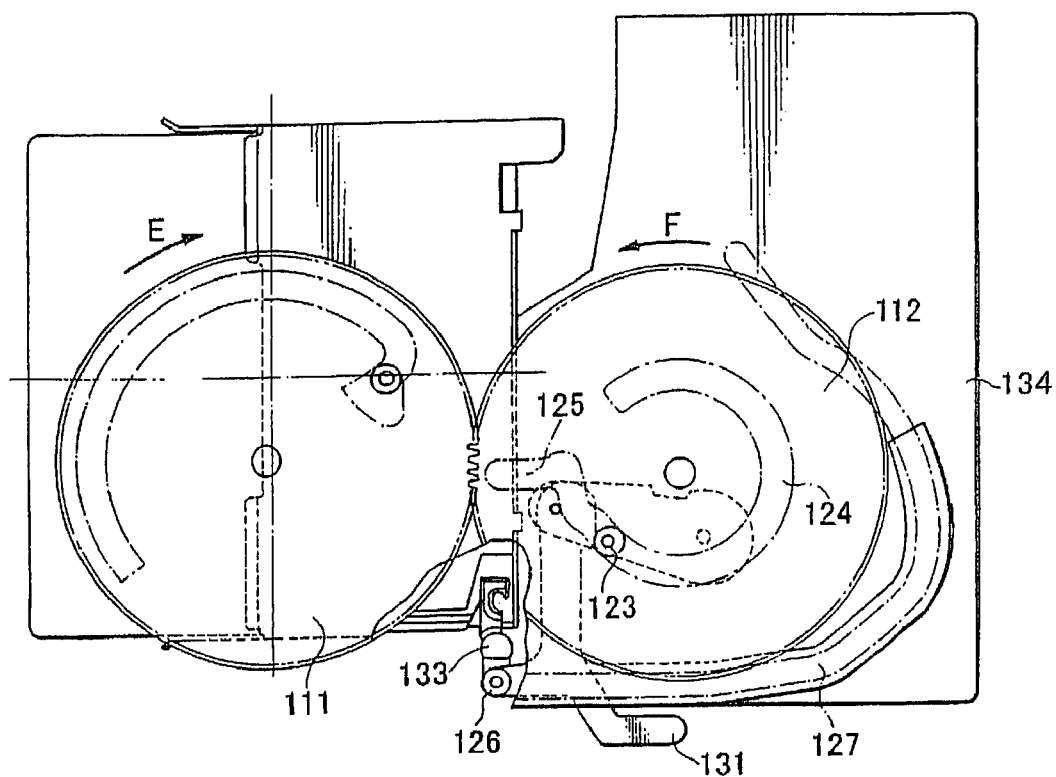
FIG. 7 shows a plan of the threading mechanism of a magnetic writing/reading apparatus according to the conventional art.
Figure 8:
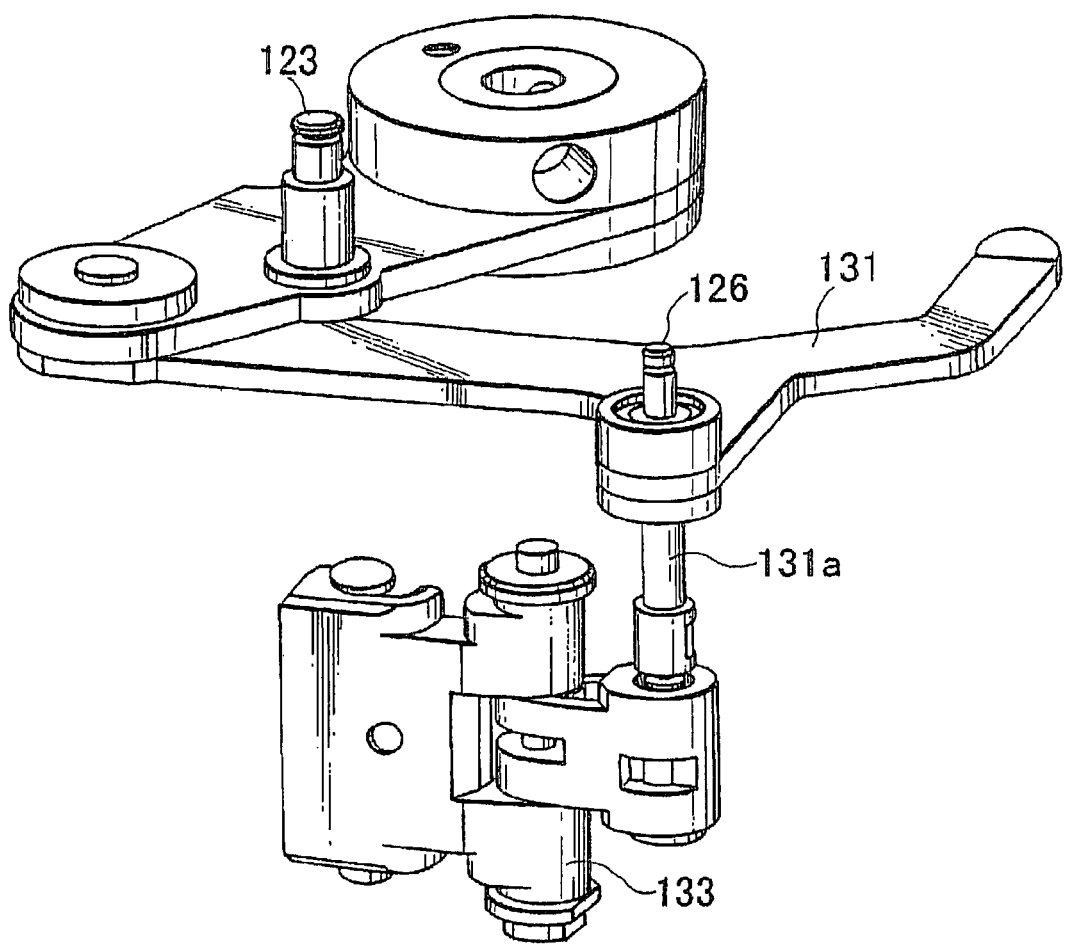
FIG. 8 illustrates the arm and leader block part of the threading mechanism of the magnetic writing/reading apparatus according to the conventional art.
Figures 9A, 9B:
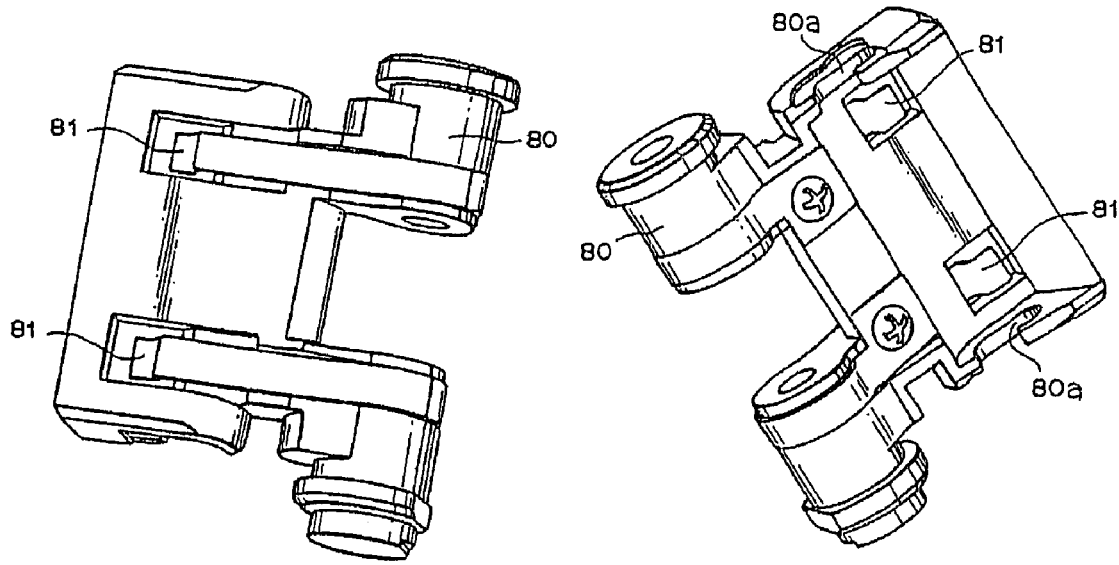
FIG. 9A illustrates the structure of the leader block of the threading mechanism of the magnetic writing/reading apparatus according to the conventional art.
FIG. 9B illustrates the structure of the leader block of such a threading mechanism of the magnetic writing/reading apparatus according to the conventional art in another aspect.

The tape cartridge 50 in the magnetic tape device of the magnetic writing/reading apparatus is the same as what was described in BACKGROUND OF THE INVENTION and illustrated in FIG. 6. The tape cartridge 50 has a reel 50c for winding a tape 50b.

The magnetic tape device of the magnetic writing/reading apparatus has a base 1 on which the tape cartridge 50 is loaded, a head 2 for reading and writing information out of and onto a magnetic tape, a reel 3 for taking up a tape 50b, a tape guide 4 for guiding the tape 50b, and a movable arm for pulling the tape 50b out of the tape cartridge 50. To the movable arm 5 are fitted an arm boss 5a and an arm shaft 5b for guiding the movable arm 5, and to the arm shaft 5b is rotatably fitted a leader block 10. As illustrated in FIG. 1C and FIG. 1D, the guides 30 and 32 receives and guides the guide post 10b in order to restrain the rotation of the leader block 10 about the arm shaft 5b.

FIG. 2 illustrates the structure of the leader block and a leader block holder.

The leader block 10 has a leader block holder 11. The leader block 10 further has a leader block spring 12 which, intervening between the leader block 10 and the leader block holder 11, presses the leader block holder 11 by applying a force in the direction of arrow D. Although a coil-shaped example is shown of this leader block spring 12, it can as well be a leaf spring. The leader block holder 11 can move in the direction of arrows C and D. The leader block 10 is provided with hooked parts 10a at both the top and the bottom to grab the leader pin 50a, and on the top side of the leader block 10 is provided a guide post 10b. The leader block holder 11 has a holder post 11a for moving the leader block holder 11 and a shaft holder 11b for grabbing the arm shaft 5b.

Referring to FIG. 1, the base 1 has guides 30 through 33 for guiding the guide post 10b. The part of the base 1 toward the tape cartridge 50 is provided with a rotator 20 for turning the leader block 10.

Figure 3:
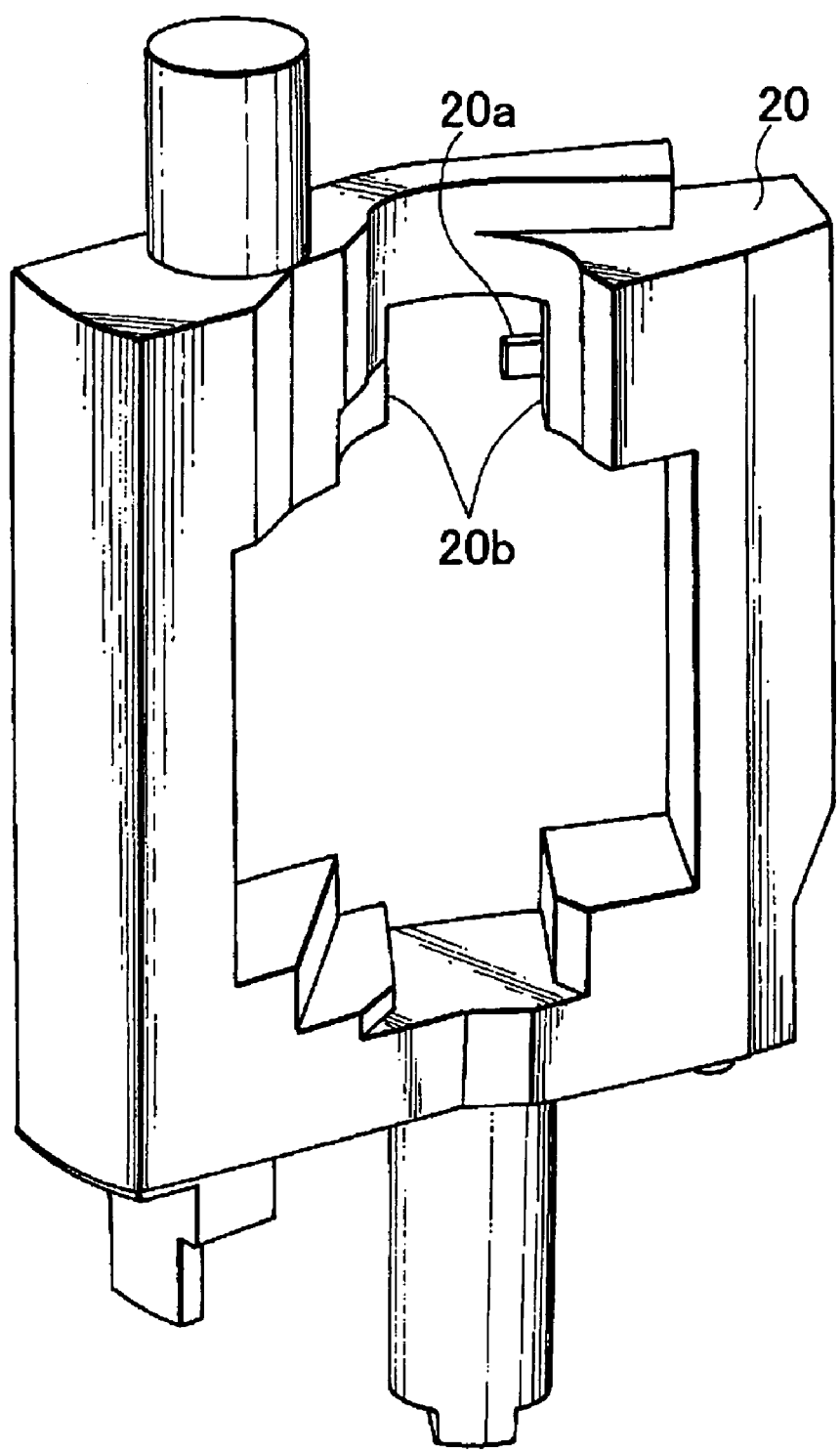
FIG. 3 illustrates the rotator.

FIG. 3 illustrates the rotator.

The rotator 20 is provided with a stopper 20a which comes into contact with the holder post 11a when the leader block 10 is inserted into the rotator 20 and a rotator guide 20b which comes into contact with the guide post 10b to turn the leader block 10.

[Operations]

Figures 4A, 4B, 4C:
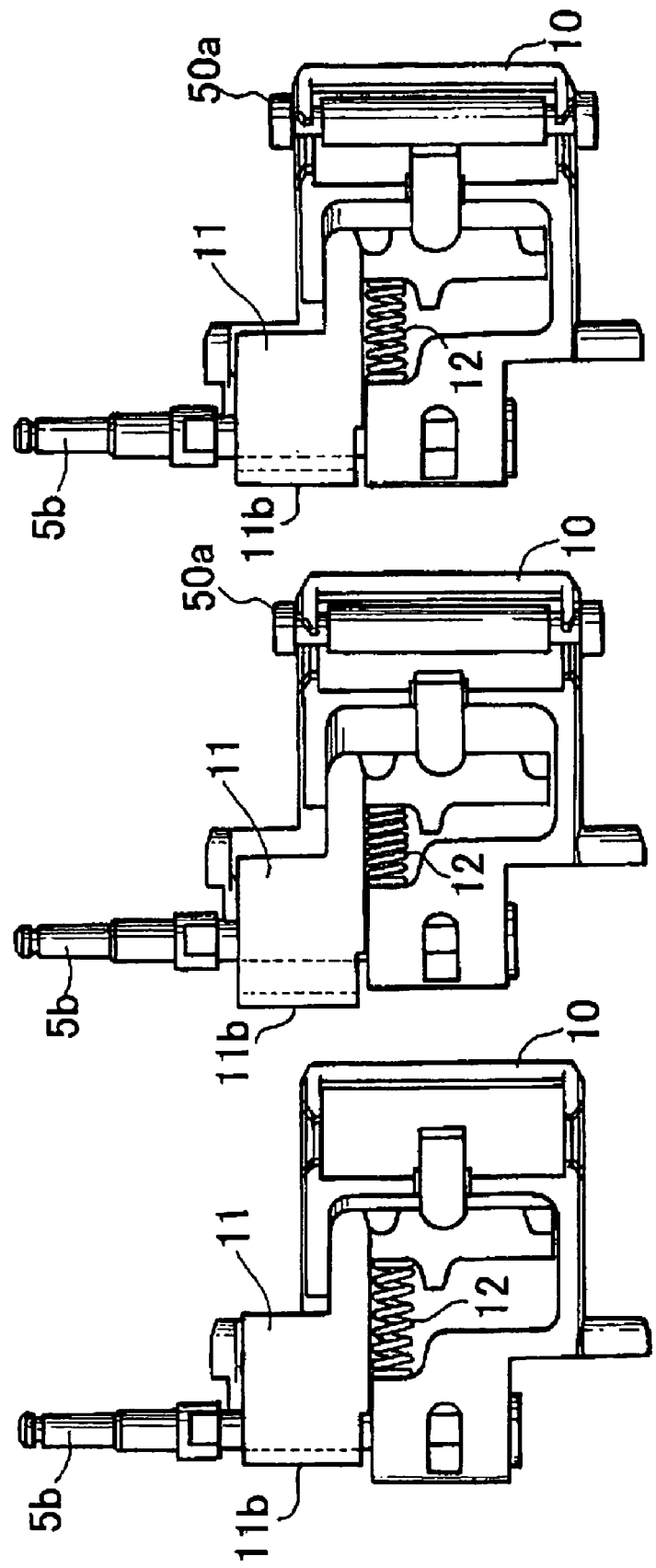
FIG. 4A illustrates an operation of the leader block holder.
FIG. 4B illustrates a further operation of the leaderblock holder.
FIG. 4C illustrates a still further operation of the leader block holder.

FIG. 4 illustrate the operations of the leader block holder, whose sequence are shown in FIG. 4A, FIG. 4B and FIG. 4C.

Figure 5A:
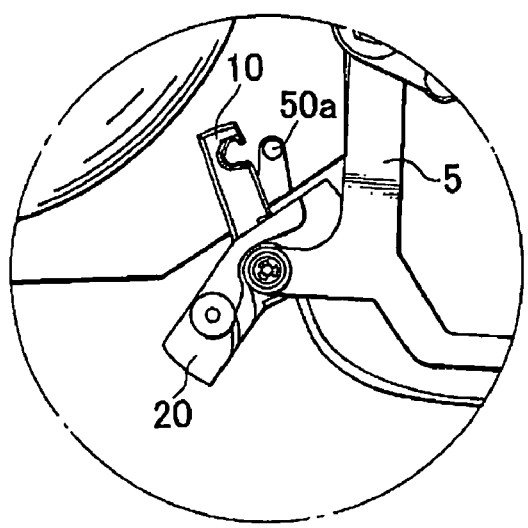
FIG. 5A illustrates the relationship between the leader block and the rotator.
Figure 5B:
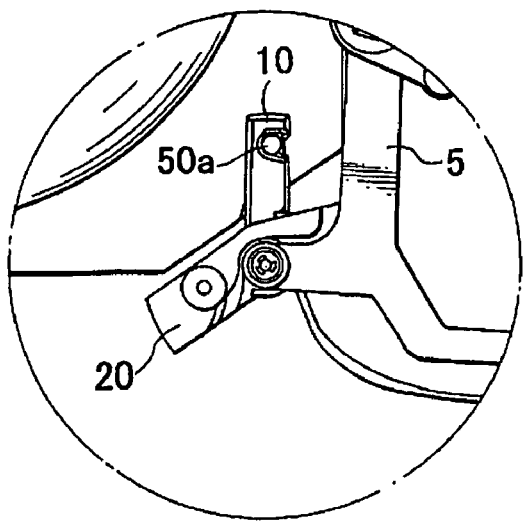
FIG. 5B illustrate the relationship between the leader block and the rotator in another aspect.

FIG. 5 illustrate the relationship between the leader block and the rotator, with FIG. 5A and FIG. 5B showing the sequence of operations.

Referring again to FIG. 1, when the arm 5 operates in the direction of arrow A, the arm boss 5a moves along a guide (not shown). Then the guidepost 10b moves along the guides 30 through 33. Thus, when the leader block 10 is moved with the arm 5 in a state in which no tape is held, the leader block 10 operates along the guides 30 through 33. Hereupon, when the leader pin 50a is not held by the leader block 10, the arm shaft 5b is restrained, held between the shaft holder 11b and the leader block 10 by the force of the leader block spring 12 as shown in FIG. 4A. As a result, the operations of the leader block 10 are stabilized. Specifically, undesirable movement of the leader block 10 about and along the arm shaft 5b is restrained, whereas necessary rotation of the leader block 10 is allowed to follow the guides 30 through 33.

When the movable arm 5 moves farther, the leader block 10 is inserted into the rotator 20, resulting in the state of FIG. 5A, and the leader block 10 becomes prepared for an operation to grab the leader pin 50a. Then, the holder post 11a shifts in contact with the stopper 20a. A gap is formed between the shaft holder 11b and the arm shaft 5b. The leader block 10 is released from the state of being restrained by the arm shaft 5b and enters into the state of FIG. 4B. When the rotator 20 turns in this state, the leader block 10 is turned by the rotator guide 20b to enter into the state of FIG. 5B, and the hooked parts 10a grab the leader pin 50a.

As the arm 5 moves farther in the direction of arrow B, the leader block 10 moves away from the rotator 20, and at the same time the tape 50b is pulled out of the tape cartridge 50. Then the leader block 10 attempts to return rightward from the state of FIG. 4B, but, as its tip hits against the leader pin 50a, the leader block holder 10 takes on the state of FIG. 4C. There still is the gap between the shaft holder 11b and the arm shaft 5b, and the leader block 10 remains freely rotatable. The tape 50b is under tension to prevent its flexure. The leader block 10 is pulled toward the tape cartridge 50 by this tension, and thereby enabled to operate stably. At this time, the leader pin 50a is restrained by the tip of the leader block holder 11. Thus the leader pin 50a is securely held by the hooked parts 10a and the leader block holder 11. There is no friction when the leader pin 50a is engaged with or disengaged from the leader block 10, which is thereby prevented from wear.

When the leader pin 50a is to be accommodated into the tape cartridge 50, the leaderblock 10 is inserted into the rotator 20. The holder post 11a and the stopper 20a come into contact with each other to take on the state of FIG. 5B, and the leader block 10 enters into the state of FIG. 4B. If the rotator 20 turns then, the leader pin 50a will come off the hooked parts 10a to enter into the state of FIG. 5A.

The present invention provides the following advantages.

A first advantage is that the arrangement of the guides enables the leader block to be inserted into the cartridge even when the tension of the tape is not at work. This makes it possible, even if the tape comes off the leader block during operation, to restore the device into the normal operating state, resulting in enhanced reliability.

A second advantage is that, when the cartridge is loaded on to the base, the leader block can be kept away from the vicinities of the cartridge. This ensures non-interference between the leader block and the cartridge, and thereby contributes to greater reliability of the device.

A third advantage is that the motions of the leader block are stabilized by restraining the leader block with the arm shaft during the operation of the arm when the tape is not pulled out. This serves to securely insert the leader block into the rotator, again resulting in enhanced reliability.

A fourth advantage is that the leader pin can be securely grabbed by the leader block. This enables the leader pin to remain held even if the tape loosens while it is being pulled out, thereby contributing to greater reliability of the device.

A fifth advantage is that a gap is generated between the leader pin and the leader block when the leader pin is engaged with or disengaged from the leader block. This feature serves to prevent wear from adversely affecting any component and dust from generating, making it easier to hold the leader pin and thereby contributing to greater reliability.

A sixth advantage is that the leader pin and the arm shaft are grabbed by the same constituent part. This contributes to reducing the number of parts and accordingly the cost.

While this invention has been described with reference to illustrative embodiments, this description is not intended to be construed in a limiting sense. Various modifications of the illustrative embodiments as well as other embodiments of the invention will be apparent to persons skilled in the art upon reference to this description. It is therefore contemplated that the appended claims will cover any such modifications or embodiments as fall within the true scope of the invention.

What is claimed is:

1. An apparatus for threading a tape wound on a supply reel and provided with a coupling element at a free end thereof, said apparatus comprising:
   a take-up reel;
   a leader block adapted to establish a connection with said coupling element of said tape and assuming one of a connected state and an unconnected state;
   a carriage transporting said leader block between a first position near said supply reel and a second position near said take-up reel through intermediate positions along a moving path;
   a shaft rotatably connecting said leader block and said carriage; and
   a holding element selectively engageable with and disengageable from said shaft to restrain and release rotation of said leader block with respect to said carriage depending on a state and/or a position of said leader block.

2. The apparatus of claim 1, wherein said holding element restrains rotation of said leader block when said leader block is positioned in at least a part of said intermediate positions, and said holding element releases rotation of said leader block when said leader block is positioned in said first position.

3. The apparatus of claim 1, wherein said holding element restrains rotation of said leader block when said leader block is in said unconnected state and positioned in at least a part of said intermediate positions, said holding element releases rotation of said leader block when said leader block is positioned in said first position, and said holding element releases rotation of said leader block when said leader block is in said connected state and positioned in at least a part of said intermediate positions.

4. The apparatus of claim 1, wherein said holding element comprises a clamp selectively assuming one of a holding position and a releasing position, said clamp holds said shaft when said clamp is in said holding position, and said clamp releases said shaft when said clamp is in said releasing position.

5. The apparatus of claim 4, wherein said clamp assumes said holding position when said leader block is positioned in at least a part of said intermediate positions, and said clamp assumes said releasing position when said leader block is positioned in said first position.

6. The apparatus of claim 5, wherein said clamp comprises a spring and a first tab, said spring biases said clamp toward said holding position, and said clamp moves from said holding position to said releasing position when said first tab is moved.

7. The apparatus of claim 4, wherein said clamp assumes said holding position when said leader block is in said unconnected state and positioned in at least a part of said intermediate positions, said clamp assumes said releasing position when said leader block is positioned in said first position, and said clamp assumes said releasing position when said leader block is in said connected state and positioned in at least a part of said intermediate positions.

8. The apparatus of claim 7, wherein said clamp comprises a spring, a first tab and a second tab, said spring biases said clamp toward said holding position, said clamp moves from said holding position to said releasing position when said first tab is moved, and said second tab holds said clamp in said releasing position by contacting said coupling element of said tape when said leader block is in said connected state.

9. The apparatus of claim 8, wherein said second tab retains said coupling element of said tape.

10. The apparatus of claim 8, further comprising:
    a rotator turning said leader block;
    a stopper provided with said rotator coming into contact with said first tab;
    wherein said first tab holds said clamp in said releasing position, when said leader block is in said first position, by moving in contact with said stopper.

11. The apparatus of claim 1, wherein said holding element comprises a guide along said moving path receiving and guiding at least a portion of said leader block.

12. The apparatus of claim 1, wherein said coupling element comprises a pin, and said leader block has a groove adapted to receive said pin.

13. An apparatus for threading a tape wound on a supply reel and provided with a coupling element at a free end thereof, said apparatus comprising:
    a take-up reel;
    a leader block adapted to establish a connection with said coupling element of said tape and assuming one of a connected state and an unconnected state;
    means for transporting said leader block between a first position near said supply reel and a second position near said take-up reel through intermediate positions along a moving path;
    means for rotatably connecting said leader block and said means for transporting; and
    means for selectively engaging with and disengaging from said rotatable connecting means to restrain and release rotation of said leader block with respect to said means for transporting depending on a state and/or a position of said leader block.

14. The apparatus of claim 13, wherein said means for selectively engaging and disengaging comprises a clamp selectively assuming one of a holding position and a releasing position; wherein said clamp holds said means for rotatably connecting when said clamp is in said holding position, and said clamp releases said means for rotatably connecting when said clamp is in said releasing position; wherein said clamp assumes said holding position when said leader block is in said unconnected state and positioned in at least a part of said intermediate positions, said clamp assumes said releasing position when said leader block is positioned in said first position, and said clamp assumes said releasing position when said leader block is in said connected state and positioned in at least a part of said intermediate positions; wherein said clamp comprises a spring, a first tab and a second tab, said spring biases said clamp toward said holding position, said clamp moves from said holding position to said releasing position when said first tab is moved, and said second tab holds said clamp in said releasing position by contacting said coupling element of said tape when said leader block is in said connected state; and wherein said device further comprises: a rotator turning said leader block; a stopper provided with said rotator coming into contact with said first tab; wherein said first tab holds said clamp in said releasing position, when said leader block is in said first position, by moving in contact with said stopper.

15. A data storage apparatus for threading a tape wound on a supply reel and provided with a coupling element at a free end thereof in order to execute a read and/or a write operation on said tape, said data storage apparatus comprising:
- a take-up reel;
- a leader block adapted to establish a connection with said coupling element of said tape and assuming one of a connected state and an unconnected state;
- a carriage transporting said leader block between a first position near said supply reel and a second position near said take-up reel through intermediate positions along a moving path;
- a shaft rotatably connecting said leader block and said carriage; and
- a holding element selectively engageable with and disengageable from said shaft to restrain and release rotation of said leader block with respect to said carriage depending on a state and/or a position of said leader block.

16. The apparatus of claim 15, wherein said holding element comprises a clamp selectively assuming one of a holding position and a releasing position; wherein said clamp holds said shaft when said clamp is in said holding position, and said clamp releases said shaft when said clamp is in said releasing position; wherein said clamp assumes said holding position when said leader block is in said unconnected state and positioned in at least a part of said intermediate positions, said clamp assumes said releasing position when said leader block is positioned in said first position, and said clamp assumes said releasing position when said leader block is in said connected state and positioned in at least a part of said intermediate positions; wherein said clamp comprises a spring, a first tab and a second tab, said spring biases said clamp toward said holding position, said clamp moves from said holding position to said releasing position when said first tab is moved, and said second tab holds said clamp in said releasing position by contacting said coupling element of said tape when said leader block is in said connected state; and wherein said device further comprises: a rotator turning said leader block; a stopper provided with said rotator coming into contact with said first tab; wherein said first tab holds said clamp in said releasing position, when said leader block is in said first position, by moving in contact with said stopper.

* * * * *